US011586086B2

(12) United States Patent
Wang et al.

(10) Patent No.: US 11,586,086 B2
(45) Date of Patent: Feb. 21, 2023

(54) PIXEL ARCHITECTURE, ARRAY SUBSTRATE AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Yang Wang, Beijing (CN); Bo Feng, Beijing (CN); Xiaoxiao Chen, Beijing (CN); Wenjun Xiao, Beijing (CN); Hao Xu, Beijing (CN); Zhiying Bao, Beijing (CN); Tianxin Zhao, Beijing (CN); Wenkai Mu, Beijing (CN); Bingqing Yang, Beijing (CN); Yi Liu, Beijing (CN); Shijun Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/298,456

(22) PCT Filed: Aug. 21, 2020

(86) PCT No.: PCT/CN2020/110577
§ 371 (c)(1),
(2) Date: May 28, 2021

(87) PCT Pub. No.: WO2021/032199
PCT Pub. Date: Feb. 25, 2021

(65) Prior Publication Data
US 2022/0035212 A1 Feb. 3, 2022

(30) Foreign Application Priority Data

Aug. 22, 2019 (CN) .......................... 201910777569.1

(51) Int. Cl.
*G02F 1/1368* (2006.01)
*G02F 1/1362* (2006.01)
*G09G 3/36* (2006.01)

(52) U.S. Cl.
CPC ..... *G02F 1/136286* (2013.01); *G09G 3/3614* (2013.01)

(58) Field of Classification Search
CPC ................................................ G02F 1/136286
See application file for complete search history.

(56) References Cited

U.S. PATENT DOCUMENTS 6,628,355 B1 * 9/2003 Takahara ............. H04N 9/3167
349/86
7,136,040 B1 11/2006 Park et al.
(Continued)

FOREIGN PATENT DOCUMENTS

CN 103076704 A 5/2013
CN 202948235 U 5/2013
(Continued)

OTHER PUBLICATIONS

First Office Action dated Feb. 2, 2021 by the China National Intellectual Property Administration for China patent application No. 201910777569.1.
(Continued)

*Primary Examiner* — Sang V Nguyen
(74) *Attorney, Agent, or Firm* — IP & T Group LLP

(57) ABSTRACT

A pixel architecture includes sub-pixels, gate lines extending in first direction and data lines. Two gate lines are provided between every two adjacent rows of sub-pixels. Each data line includes first extension portions extending in first direction and second extension portions extending in second direction intersecting the first direction. The gate lines and the data lines define pixel regions each being provided with (Continued)

two sub-pixels arranged in the first direction therein. Every two adjacent first extension portions and a second extension portion connected between the two first extension portions constitute a projection portion accommodating at least one pixel region. All sub-pixels in each projection portion are coupled to the same data line to receive data voltage signals with the same voltage polarity. Sub-pixels in two adjacent projection portions in the second direction are coupled to two adjacent data lines to receive data voltage signals with opposite voltage polarities.

14 Claims, 15 Drawing Sheets

(56) References Cited

U.S. PATENT DOCUMENTS

| | | | |
|---|---|---|---|
| 8,144,094 B2 | 3/2012 | Brown Elliott et al. | |
| 2013/0271716 A1 | 10/2013 | Ando | |
| 2013/0321251 A1* | 12/2013 | Kang | G09G 3/3614 345/87 |
| 2014/0028945 A1* | 1/2014 | Wang | G02F 1/13624 349/46 |
| 2015/0332639 A1 | 11/2015 | Xu et al. | |
| 2016/0342044 A1* | 11/2016 | Chang | G02F 1/136286 |
| 2017/0301696 A1* | 10/2017 | Yang | H01L 27/32 |
| 2018/0061291 A1* | 3/2018 | Ren | H01L 27/124 |
| 2019/0287473 A1 | 9/2019 | Tominaga | |
| 2020/0286435 A1 | 9/2020 | Feng et al. | |
| 2020/0355970 A1* | 11/2020 | Cheng | G02F 1/136286 |

FOREIGN PATENT DOCUMENTS

| | | | |
|---|---|---|---|
| CN | 103207489 A | 7/2013 | |
| CN | 103376607 A | 10/2013 | |
| CN | 204101859 U | 1/2015 | |
| CN | 104992957 A | 10/2015 | |
| CN | 207380420 U | 5/2018 | |
| CN | 109215600 A | 1/2019 | |
| CN | 109523972 A | 3/2019 | |
| CN | 109817146 A | 5/2019 | |
| CN | 109872702 A | 6/2019 | |
| CN | 110109309 A | 8/2019 | |
| CN | 110114717 A | 8/2019 | |
| CN | 110456586 A | 11/2019 | |
| EP | 2988166 A1 | 2/2016 | |
| KR | 20170020107 A | 2/2017 | |
| KR | 10-2017-0035403 | * 3/2017 | G09G 3/36 |
| KR | 20170035403 A | 3/2017 | |

OTHER PUBLICATIONS

Notification to Grant Patent Right for invention dated May 8, 2021 by the China National Intellectual Property Administration for China patent application No. 201910777569.1.

* cited by examiner

PIXEL ARCHITECTURE, ARRAY SUBSTRATE AND DISPLAY APPARATUS

CROSS-REFERENCE TO RELATED APPLICATIONS

This application is a national phase entry under 35 USC 371 of International Patent Application No. PCT/CN2020/110577 filed on Aug. 21, 2020, which claims priority to Chinese Patent Application No. 201910777569.1, filed on Aug. 22, 2019, which are incorporated herein by reference in their entirety.

TECHNICAL FIELD

The present disclosure relates to the field of display technologies, and in particular, to a pixel architecture, an array substrate and a display apparatus.

BACKGROUND

At present, displays with a high screen-to-body ratio (the screen-to-body ratio serving to represent a relative ratio of a screen to an area of a display panel). In particular, full-screen displays (with a screen-to-body ratio reaching more than 80%, and closing to 100%) have gradually become one of the mainstream development directions of the field of display technologies.

Sizes of left and right bezels of a display screen may be reduced by manufacturing thin film transistors (TFTs) of a pixel driving circuit of the display screen with a low-resistance material and a high-mobility semiconductor. A size of a lower bezel of the display screen may be reduced by adopting a dual-gate line structure in the pixel driving circuit.

SUMMARY

In one aspect, a pixel architecture including a plurality of sub-pixels arranged in an array, a plurality of gate lines and a plurality of data lines is provided. The gate lines extend in a first direction, and the first direction is a row direction in which the plurality of sub-pixels are arranged. Two gate lines of the plurality of gate lines are provided between every two adjacent rows of sub-pixels. Each data line includes a plurality of first extension portions and a plurality of second extension portions that are alternately connected, each first extension portion extends in the first direction, each second extension portion extends in a second direction, and the first direction intersects the second direction. The plurality of gate lines and the plurality of data lines define a plurality of pixel regions, and two sub-pixels arranged in the first direction are provided in each pixel region. In the data line, every two adjacent first extension portions and a second extension portion connected between the two adjacent first extension portions constitute a projection portion accommodating at least one pixel region. Every two adjacent data lines are configured to transmit data voltage signals with opposite voltage polarities. All sub-pixels in each projection portion are coupled to a same data line to receive data voltage signals with same voltage polarity. Sub-pixels in two adjacent projection portions in the second direction are respectively coupled to two adjacent data lines to receive data voltage signals with opposite voltage polarities.

In some embodiments, a projection portion accommodates one pixel region.

In some embodiments, a ratio of a length of the second extension of the data line to a dimension of a sub-pixel in the second direction is greater than 1 and less than 1.5.

In some embodiments, a projection portion accommodates two pixel regions, and the two pixel regions are arranged in the second direction.

In some embodiments, a ratio of a length of the second extension of the data line to a dimension of a sub-pixel in the second direction is greater than 2 and less than 2.5.

In some embodiments, a second extension of a data line is provided between every two adjacent pixel regions in the first direction. All sub-pixels in the pixel region are coupled to a data line located on a same side of the pixel region.

In some embodiments, in the second direction, second extensions of a same data line are alternately disposed on two sides of a same column of pixel regions.

In some embodiments, two sub-pixels in a same pixel region are coupled to two gate lines adjacent to the pixel region, respectively.

In some embodiments, two gate lines that are adjacent to a row of pixel regions, and are located on two sides of the row of pixel regions are a first gate line and a second gate line, respectively. For two sub-pixels in each pixel region of the row of pixel regions, one sub-pixel is coupled to the first gate line, and another sub-pixel is coupled to the second gate line.

In some embodiments, the two sub-pixels of the pixel region arranged in the first direction are a first sub-pixel and a second sub-pixel, respectively. Two adjacent pixel regions in the row of pixel regions are a first pixel region and a second pixel region, respectively. A first sub-pixel in the first pixel region is coupled to the second gate line, and a second sub-pixel in the first pixel region is coupled to the first gate line. A first sub-pixel in the second pixel region is coupled to the first gate line, and a second sub-pixel in the second pixel region is coupled to the second gate line.

In some embodiments, the first extensions of the data line are located between two gate lines that are between two adjacent rows of sub-pixels.

In some embodiments, a ratio of a length of the first extension of the data line to a dimension of a sub-pixel in the first direction is greater than 2, and is less than or equal to 3.

In some embodiments, the data line further includes a plurality of transition portions, and each transition portion connects a first extension portion and a second extension portion that are adjacent to each other.

In some embodiments, the transition portion of the data line is linear, and an included angle between the linear transition portion and the first extension portion connected to the linear transition portion, and an included angle between the transition portion and the second extension portion connected to the transition portion, are both obtuse angles. Or, the transition portion is arc-shaped, and a center of a circle of the arc-shaped transition portion is located inside the projection portion surrounded by the first extension portion and the second extension portion that are connected by the transition portion.

In some embodiments, the first direction is perpendicular to the second direction.

In another aspect, an array substrate including a base and a pixel architecture disposed on the base is provided, and the pixel architecture is the pixel architecture according to any one of the above embodiments.

In yet another aspect, a display apparatus including the array substrate in the above embodiments is provided.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method or an actual timing of signals to which the embodiments of the present disclosure relate.

FIG. 5A is a schematic diagram showing sub-pixels in one charging condition, in accordance with some embodiments of the present disclosure;

FIG. 5B is a diagram showing a bright and dark distribution of sub-pixels, in accordance with some embodiments of the present disclosure;

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description of the specification, the terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a/the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The use of the phase "applicable to" or "configured to" herein means an open and inclusive expression, which does not exclude apparatuses that are applicable to or configured to perform additional tasks or steps.

Figure 1:
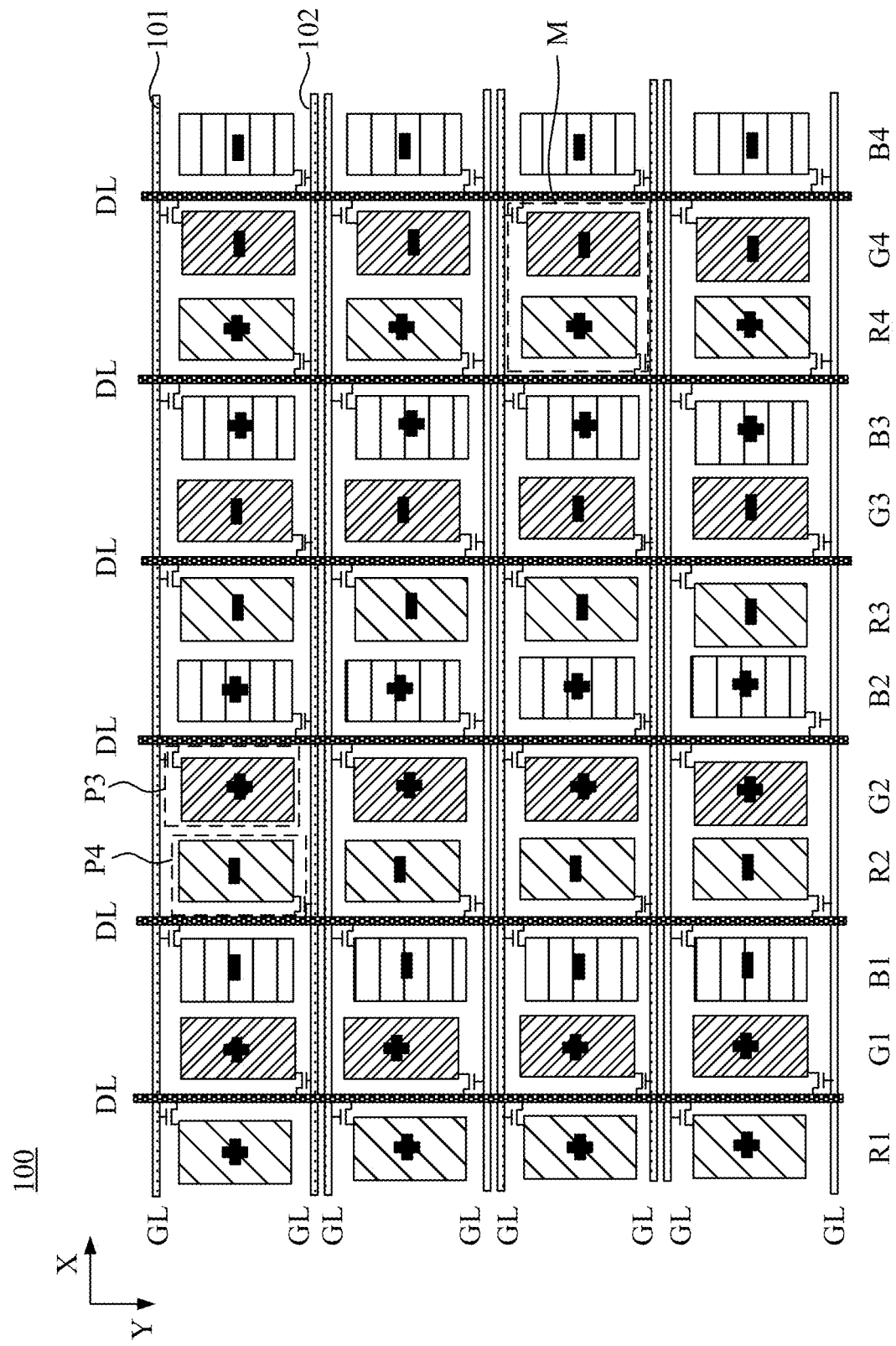
FIG. 1 is a diagram showing a pixel architecture.

As shown in FIG. 1, a pixel architecture 100 with a dual-gate line includes a plurality of gate lines (GL) arranged in parallel, and a plurality of data lines (DL) arranged in parallel. The gate lines GL and the data lines DL are distributed crosswise and define a plurality of pixel regions M, the gate lines GL extend in a first direction X (i.e., a row direction), and two gate lines GL are provided between two adjacent rows of pixel regions M. Two sub-pixels (e.g., a third sub-pixel P3 and a fourth sub-pixel P4 in FIG. 1) in the first direction X are provided in each pixel region M, and two sub-pixels in a same pixel region M are connected to different gate lines GL (e.g., a third gate line 101 and a fourth gate line 102 in FIG. 1), respectively. Moreover, the third gate line 101 and the fourth gate line 102 connected to the two sub-pixels are adjacent to a row of sub-pixels where the two sub-pixels are located, and are located on two sides of the row of sub-pixels, respectively. The two sub-pixels in the same pixel region M are connected to data lines DL located on two sides of the pixel region M, respectively, and the two adjacent data lines DL are configured to transmit data voltage signal with opposite voltage polarities.

The inventors of the present disclosure have discovered through research that, when the pixel architecture 100 with the dual-gate line is working, the third gate line 101 is turned on at first, and third sub-pixels P3 in the pixel regions are charged; then the third gate line 101 is turned off and the fourth gate line 102 is turned on, and fourth sub-pixels P4 in the pixel regions are charged. Since the fourth gate line 102 is adjacent to but not connected to pixel electrodes of the third sub-pixels P3, capacitances exist between the fourth gate line 102 and the third sub-pixels P3. When the fourth sub-pixels P4 are being charged, a voltage of the fourth gate line 102 suddenly rises under an effect of capacitive coupling, so that a coupled pull-up phenomenon occurs on electrode voltages of the third sub-pixels P3. For example, an absolute value of a voltage of a third sub-pixel P3 with the positive voltage polarity (represented by the symbol "+" in FIGS. 1 and 2) may increase due to the coupled pull-up phenomenon, thereby increasing brightness of the third sub-pixel P3 (as shown by the upward arrow in FIG. 2); similarly, an absolute value of a voltage of a third sub-pixel P3 with the negative voltage polarity (represented by the symbol "−" in FIGS. 1 and 2) may decrease due to the coupled pull-up phenomenon, thereby decreasing the brightness of the third sub-pixel P3 (as shown by the downward arrow in FIG. 2).

It will be noted that, brightness of a sub-pixel that do not generate the coupled pull-up phenomenon is "medium"; brightness of a sub-pixel with the positive polarity voltage that generate the coupled pull-up phenomenon is "bright"; and brightness of a sub-pixel with the negative polarity voltage that generate the coupled pull-up phenomenon is "dark".

Figure 2:
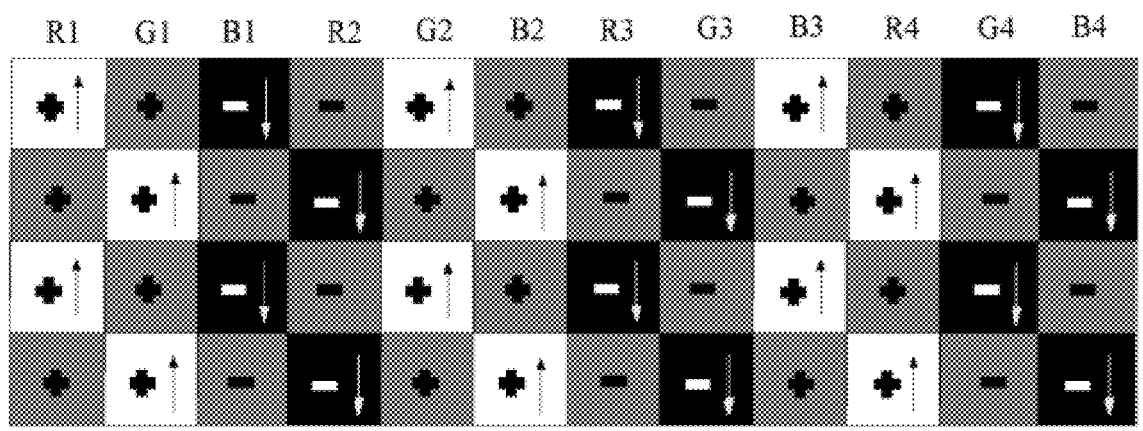
FIG. 2 is a diagram showing a bright and dark distribution of sub-pixels in a same frame of image.

Referring to a bright and dark distribution of sub-pixels in a same frame in FIG. 2 (FIG. 2 shows an example in which the third gate line 101 is turned on first, then the fourth gate line 102 is turned on for odd-numbered rows of sub-pixels, and the fourth gate line 102 is turned on first, then the third gate line 101 is turned on for even-numbered rows of sub-pixels) in combination with the pixel architecture 100 in FIG. 1, in a second direction Y (a column direction), a brightness distribution of sub-pixels in a third column is a cycle of "dark, medium, dark, and medium", and a brightness distribution of sub-pixels in a fourth column is a cycle of "medium, dark, medium, and dark", that is, overall brightness of the sub-pixels in the third column and overall brightness of the sub-pixels in the fourth column are relatively dark. In the second direction Y, a brightness distribution of sub-pixels in a first column is a cycle of "bright, medium, bright, and medium", and a brightness distribution of sub-pixels in a second column is a cycle of "medium, bright, medium, and bright", that is, overall brightness of the sub-pixels in the first column and overall brightness of the sub-pixels in the second column are relatively bright. The overall brightness of sub-pixels in two adjacent columns is relatively dark and relatively bright, which results in an undesirable phenomenon of shake line in a frame of image. The "shake line" refers to that, when an observer's line of sight shifts, for example, when the observer turns his or her head to the left or to the right, the observer observes a phenomenon that bright and dark strips appear on a display screen.

Figure 3:
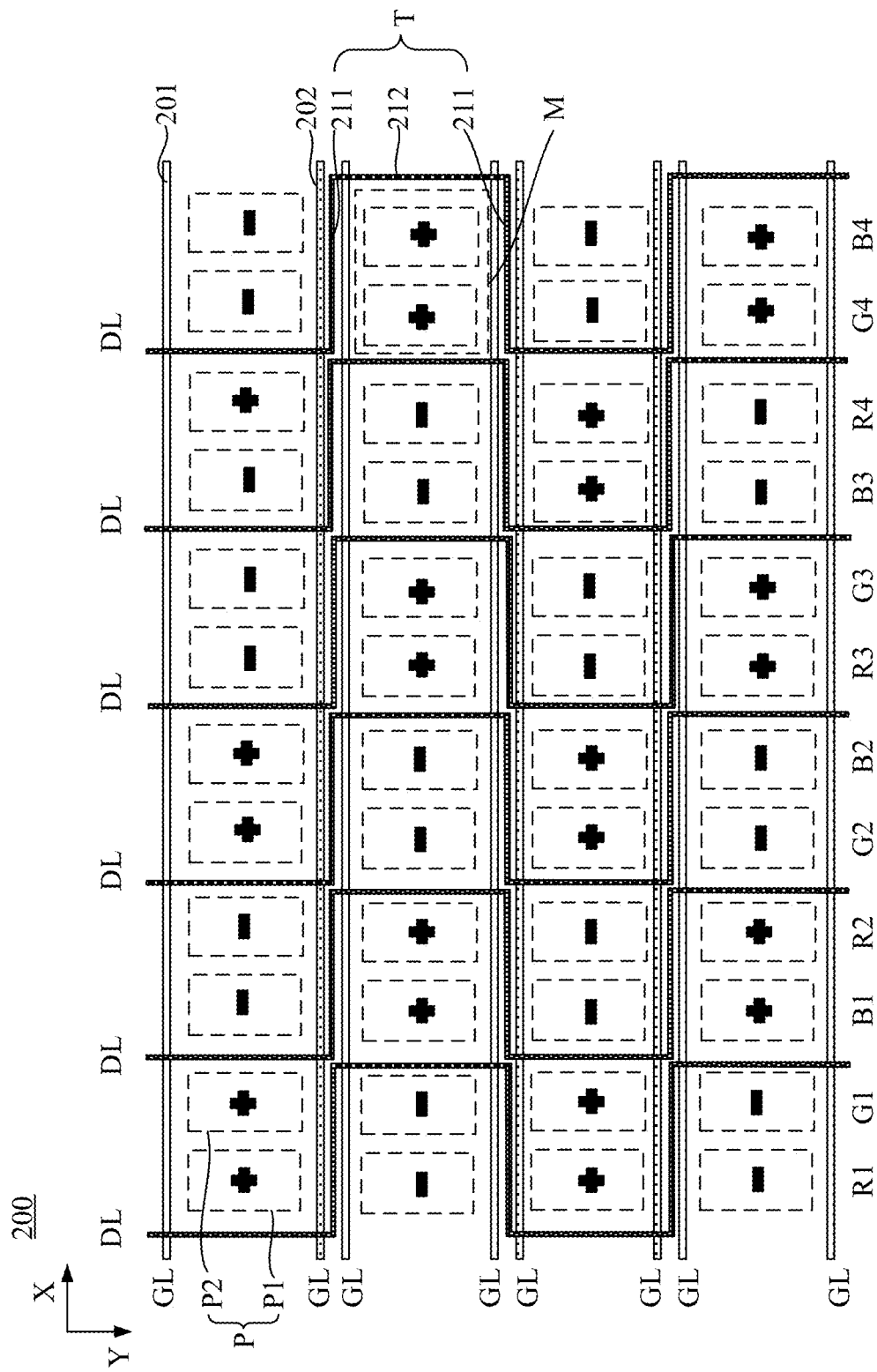
FIG. 3 is a diagram showing a pixel architecture, in accordance with some embodiments of the present disclosure.
Figure 4A:
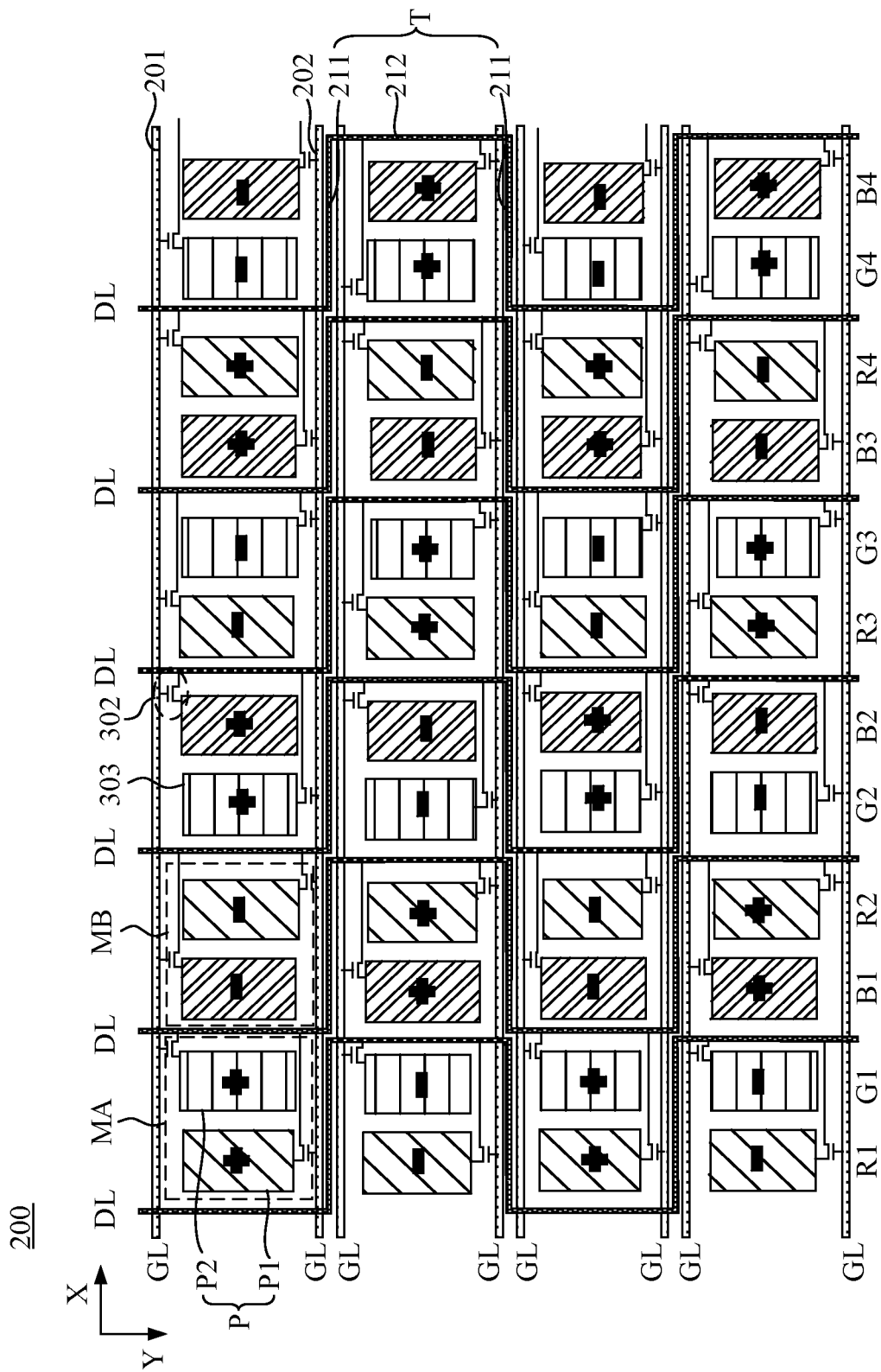
FIG. 4A is a diagram showing another pixel architecture, in accordance with some embodiments of the present disclosure.

Based on the above research and findings, some embodiments of the present disclosure provide a pixel architecture. As shown in FIGS. 3 and 4A, the pixel architecture 200 includes a plurality of sub-pixels P arranged in an array, a plurality of gate lines GL and a plurality of data lines DL. A row direction in which the plurality of sub-pixels P are arranged is the first direction X, a column direction in which the plurality of sub-pixels P are arranged is the second direction Y, and the first direction X intersects the second direction Y.

Each gate line GL extends in the first direction X, and two gate lines of the plurality of gate lines GL are provided between two adjacent rows of sub-pixels P.

The data line DL includes a plurality of first extension portions 211 and a plurality of second extension portions 212 that are alternately connected, the first extension portions 211 extend in the first direction X, and the second extension portions 212 extend in the second direction Y.

For example, as shown in FIGS. 3 and 4A, the first direction X is perpendicular to the second direction Y. In this case, an extension direction of the first extension portions 211 may be perpendicular to an extension direction of the second extension portions 212.

The plurality of gate lines GL and the plurality of data lines DL define a plurality of pixel regions M, and two sub-pixels P (e.g., a first sub-pixel P1 and a second sub-pixel P2 in FIG. 3) arranged in the first direction X are provided in each pixel region M. In a same data line DL, two adjacent first extension portions 211 and a second extension portion 212 connected between the two adjacent first extension portions 211 constitute a projection portion T, and a projection portion T accommodate at least one pixel region M (FIG. 3 shows a situation where a projection portion T accommodates one pixel region M).

For example, as shown in FIGS. 3 and 4A, a ratio of a length of the first extension portion 211 of the data line DL to a dimension of a sub-pixel P in the first direction X is greater than 2, and is less than or equal to 3, so as to ensure that the projection portion T may accommodate two sub-pixels P in the first direction X. For example, the ratio of the length of the first extension portion 211 to the dimension of the sub-pixel P in the first direction X may be 2.2, 2.5, 2.8 or 3.

For example, as shown in FIGS. 3 and 4A, in a case where a projection portion T accommodates one pixel region M, a ratio of a length of the second extension portion 212 of the data line DL to a dimension of a sub-pixel P in the second direction Y is greater than 1, and is less than 1.5, so as to ensure that the projection portion T may accommodate one sub-pixel P in the second direction Y. For example, the ratio of the length of the second extension portion 212 to the dimension of the sub-pixel P in the second direction Y may be 1.1, 1.2, 1.3 or 1.4.

In some embodiments, as shown in FIGS. 3 and 4A, each sub-pixel P includes a thin film transistor 302 and a pixel electrode 303. A gate of the thin film transistor 302 is connected to a gate line GL, a drain of the thin film transistor 302 is connected to the pixel electrode 303, and a source of the thin film transistor 302 is connected to a data line DL, so as to control the opening or closing of the sub-pixel P by controlling the opening or closing of the gate line GL.

In some embodiments, two adjacent data lines DL are configured to transmit data voltage signals with the opposite voltage polarities, that is, two adjacent data lines DL, one data line DL of which transmits a positive polarity voltage, and the other data line DL of which transmits a negative polarity voltage. All sub-pixels P in each projection portion T are coupled to a same data line DL to receive data voltage signals with the same voltage polarity. Sub-pixels P in two adjacent projection portions T in the second direction Y are coupled to two adjacent data lines DL, respectively, so as to receive data voltage signals with the opposite voltage polarities.

For example, as shown in FIGS. 3 and 4A, all sub-pixels P in the projection portion T receive data voltage signals with the same voltage polarity. The sub-pixels P in two adjacent projection portions T in the second direction Y receive the data voltage signals with the opposite voltage polarities. Therefore, the sub-pixels P in two adjacent projection portions T in the first direction X receive the data voltage signals with the opposite voltage polarities.

Sub-pixels in any two adjacent pixel regions M in the first direction X or the second direction Y may have the opposite voltage polarities (represented by the symbol "+" and the symbol "−" in the drawings) through the "S-shaped" wiring design of the data lines DL.

In some embodiments, as shown in FIGS. 3 and 4A, a second extension portion 212 of a data line DL is provided between every two adjacent pixel regions M in the first direction X. That is, two adjacent pixel regions M in the first direction X are separated by a second extension portion 212 of a data line DL. All sub-pixels in each pixel region M are coupled to a data line DL located on a same side of the pixel region M, so as to receive data voltage signals with the same voltage polarity.

In some embodiments, as shown in FIGS. 3 and 4A, in the second direction Y, second extension portions 212 of a same data line DL are alternately disposed on two sides of a same column of pixel regions M.

In some embodiments, two sub-pixels P in the same pixel region M are coupled to two gate lines GL adjacent to the pixel region M, respectively.

For example, as shown in FIGS. 3 and 4A, two gate lines GL adjacent to a row of pixel regions M and located on two sides of the row of pixel regions M are a first gate line 201 and a second gate line 202, respectively. For two sub-pixels P in each pixel region M of the row of pixel regions M, one sub-pixel P is coupled to the first gate line 201, and the other sub-pixel P is coupled to the second gate line 202. For example, the first gate line 201 is located above a first row of pixel regions M, and the second gate line 202 is located below the first row of pixel regions M. The first sub-pixels P1 in the pixel regions M are coupled to the second gate line 202, and the second sub-pixels P2 are coupled to the first gate line 201.

The two sub-pixels P in the same pixel region M are coupled to two gate lines GL adjacent to the pixel region M through the above arrangement manner, so that the two sub-pixels P in the same pixel region M are controlled by different gate lines GL, so as to enable charging on or off.

In some embodiments, as shown in FIGS. 3 and 4A, in each pixel region M, the first sub-pixel P1 and the second sub-pixel P2 are arranged in the first direction X. In addition, two adjacent pixel regions M in the first direction X are a first pixel region MA and a second pixel region MB, respectively. A first sub-pixel P1 in the first pixel region MA is coupled to the second gate line 202, and a second sub-pixel P2 is coupled to the first gate line 201. A first sub-pixel P1 in the second pixel region MB is coupled to the first gate line 201, and a second sub-pixel P2 is coupled to the second gate line 202.

In some embodiments, each row of sub-pixels P is cyclically arranged in an order of a red sub-pixel, a green sub-pixel, and a blue sub-pixel in the first direction X. For example, the row of sub-pixels P is sequentially marked as R1, G1, B1, R2, G2, B2, R3, G3, B3, R4, G4, B4, and so on. Moreover, in the second direction Y, sub-pixels P in each column of sub-pixels P have a same light-emitting color. It can be seen that, light-emitting colors of two sub-pixels P between two adjacent data lines DL are two of red R, green G and blue B.

A method of controlling each sub-pixel P is simplified through the above arrangement manner of the sub-pixels P, thereby simplifying a wiring for controlling each sub-pixel P, so that a bezel of a display panel to which the pixel architecture 200 is applied is narrow, so as to increase a screen-to-body ratio of the display panel.

Figures 5A, 5B:
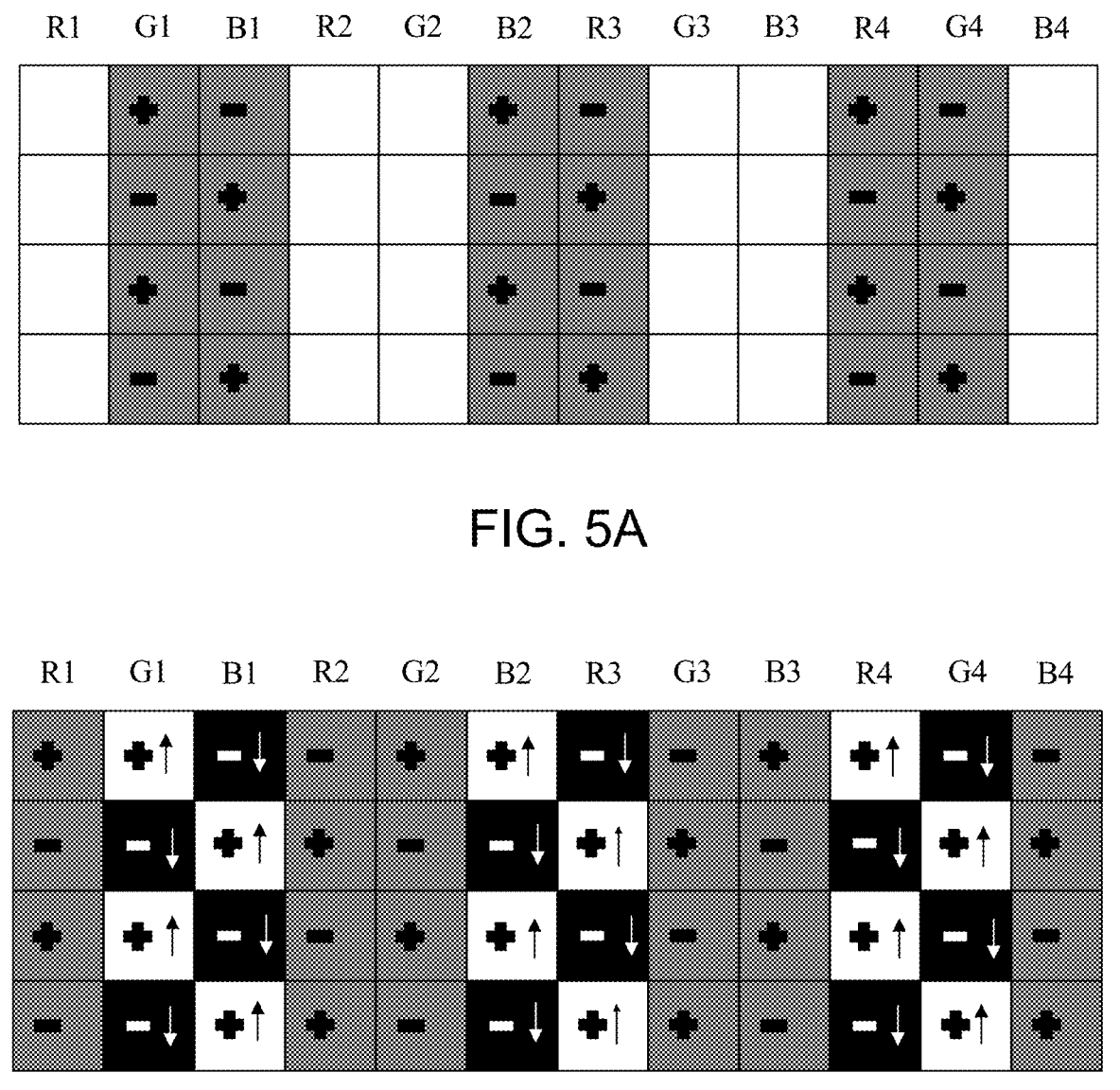

In some embodiments, when the pixel architecture 200 in the above embodiments is working, sub-pixels P in each row (an odd-numbered row or an even-numbered row) are charged according to an order in which the first gate line 201 is turned on first, and then the second gate line 202 is turned on. First, the first gate line 201 is turned on to charge columns of sub-pixels P marked as G1, B1, B2, R3, R4, G4, and so on. FIG. 5A shows a charging condition of sub-pixels P when the first gate line 201 is turned on, and brightness of each sub-pixel P after being charged is medium.

It will be noted that, white blocks in FIG. 5A represent sub-pixels P that have not been charged, and indicate that the sub-pixels P that have not been charged have no brightness.

Then, the first gate line 201 is turned off and the second gate line 202 is turned on, so as to charge columns of sub-pixels P marked as R1, R2, G2, G3, B3, B4, and so on. FIG. 5B shows a charging condition of sub-pixels P when the second gate line 202 is turned on. Since a capacitance exists between a gate line GL and a pixel electrode 303 of a sub-pixel P that is adjacent to but not connected to the gate line GL, when the second gate line 202 is turned on, a voltage of the second gate line 202 suddenly rises, which may cause the columns of sub-pixels P that are adjacent to but not connected to the second gate line 202 (the columns of sub-pixels P marked as G1, B1, B2, R3, R4 and G4 in FIG. 5A) to generate the coupled pull-up phenomenon.

Each row of sub-pixels P follows a lighting order in which the first gate line 201 is turned on first, and then the second gate line 202 is turned on, so that a bright and dark distribution of sub-pixels P in a same frame of image as shown in FIG. 5B is obtained. A brightness distribution of sub-pixels P in a same column is a cycle of "bright, dark, bright, dark" (e.g., the columns of sub-pixels P marked as G1, B2 and R4), a cycle of "dark, bright, dark, bright" (e.g., the columns of sub-pixels marked as B1, R3 and G4), or a cycle of "medium, medium, medium, medium" (e.g., the columns of sub-pixels P marked as R1, R2, G2, G3, B3 and B4).

It can be seen from the above that, brightness of two adjacent columns of sub-pixels P are the same. For example, brightness of the two columns of sub-pixels P marked as R2 and G2 are both medium. Or, brightness of two adjacent columns of sub-pixels P may be neutralized. For example, in a peripheral region of each sub-pixel P in the two columns of sub-pixels P marked as G1 and B1, there are three sub-pixels P whose voltage polarity is opposite to that of the sub-pixel P, so that brightness of the sub-pixel P may be neutralized with brightness of the three sub-pixels P in its peripheral region, and brightness of the two columns of sub-pixels P is medium. Therefore, the phenomenon of shake line may be ameliorated through the pixel architecture 200 as described above.

Figure 6A:
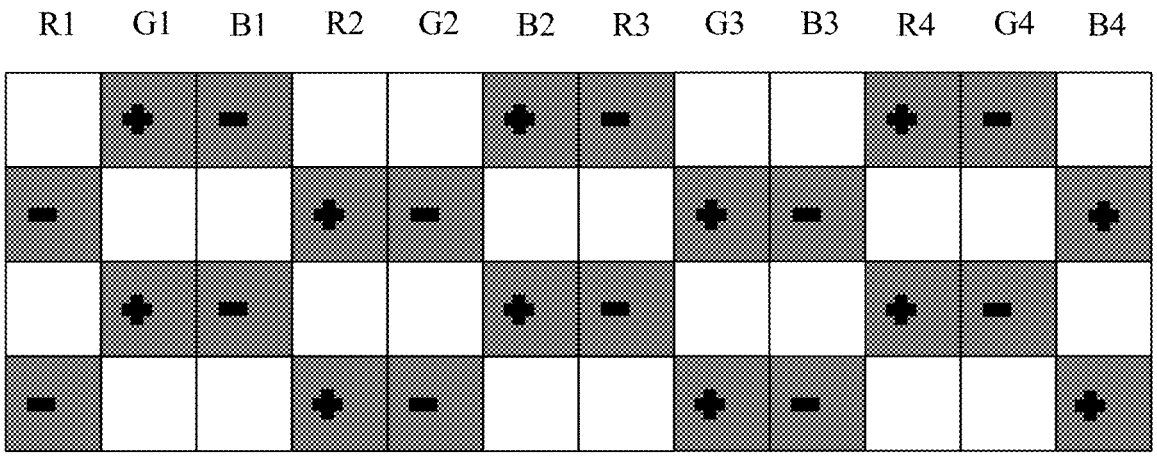
FIG. 6A is a schematic diagram showing sub-pixels in another charging condition, in accordance with some embodiments of the present disclosure.

In some other embodiments, when the pixel architecture 200 in the above embodiments is working, sub-pixels P in the odd-numbered rows (e.g., the first row) may be charged according to an order in which the first gate lines 201 are turned on first, then the second gate lines 202 are turned on; and sub-pixels P in the even-numbered rows (e.g., the second row) may be charged according to an order in which second gate lines 202 are turned on first, then first gate lines 201 are turned on. First, first gate lines 201 in odd-numbered rows and second gate lines 202 in even-numbered rows are turned on, so that in the columns marked as G1, B1, B2, R3, R4 and G4, sub-pixels P in the odd-numbered rows can be charged, and in the columns marked as R1, R2, G2, G3, B3 and B4, sub-pixels P in the even-numbered rows can be charged. FIG. 6A shows a charging condition of sub-pixels P when the first gate lines 201 in the odd-numbered rows and the second gate lines 202 in the even-numbered rows are turned on, brightness of each sub-pixel P after being charged is medium.

Figure 6B:
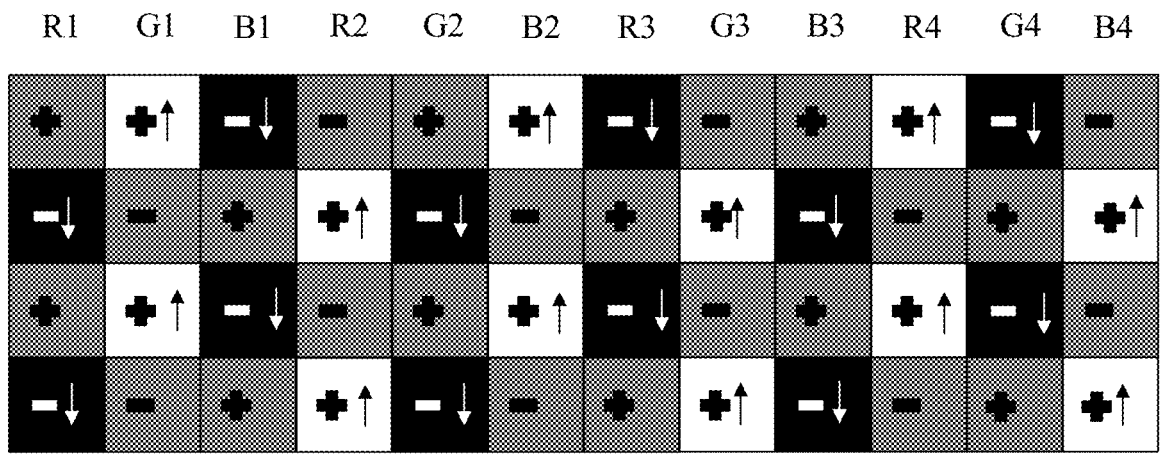
FIG. 6B is a diagram showing another bright and dark distribution of sub-pixels, in accordance with some embodiments of the present disclosure.

Then, the first gate lines 201 in the odd-numbered rows and the second gate lines 202 in the even-numbered rows are turned off, and the second gate lines 202 in the odd-numbered rows and the first gate lines 201 in the even-numbered rows are turned on. FIG. 6B shows a charging condition of sub-pixels P when the second gate lines 202 in the odd-numbered rows and the first gate lines 201 in the even-numbered rows are turned on. A bright and dark distribution of sub-pixels P in a same frame of image shown in FIG. 6B may be obtained according to the above lighting order, a brightness distribution of sub-pixels P in a same column is a cycle of "bright, medium, bright, medium" (e.g., the columns of sub-pixels P marked as G1, B2 and R4), a cycle of "dark, medium, dark, medium" (e.g., the columns of sub-pixels P marked as B1, R3 and G4), a cycle of "medium, bright, medium, bright" (e.g., the columns of sub-pixels P marked as R2, G3 and B4) or a cycle of "medium, dark, medium, dark" (e.g., the columns of sub-pixels P marked as R1, G2 and B3).

It can be seen from the above that, brightness of two adjacent sub-pixels P in two adjacent columns of sub-pixels P is the same, for example, in the two columns of sub-pixels P marked as G1 and B1, brightness of two adjacent sub-pixels P located in the even-numbered rows is medium; and in the two columns of sub-pixels P marked as R2 and G2, brightness of two adjacent sub-pixels P located in the odd-numbered rows is medium. Or, brightness of two adjacent sub-pixels P in two adjacent columns of sub-pixels P may be neutralized, for example, in the two columns of sub-pixels P marked as G1 and B1, brightness of two adjacent sub-pixels P located in the odd-numbered rows is bright and dark, respectively, and the brightness of the two adjacent sub-pixels P may be neutralized; and in the two columns of sub-pixels P marked as R2 and G2, brightness of two adjacent sub-pixels P located in the even-numbered rows is bright and dark, respectively, and the brightness of the two adjacent sub-pixels P may be neutralized. Therefore, the phenomenon of shake line may also be ameliorated through the pixel architecture 200 as described above.

In some embodiments, as shown in FIGS. 3 and 4A, the first extension portion 211 of the data line DL is located between two gate lines GL between two adjacent rows of sub-pixels. For example, the second gate line 202 is located above the first extension portion 211, and the first gate line 201 is located below the first extension portion 211, which facilitates coupling between a sub-pixel P located above the first extension portion 211 and the second gate line 202, and coupling between a sub-pixel P located below the first extension portion 211 and the first gate line 201.

Figure 4B:
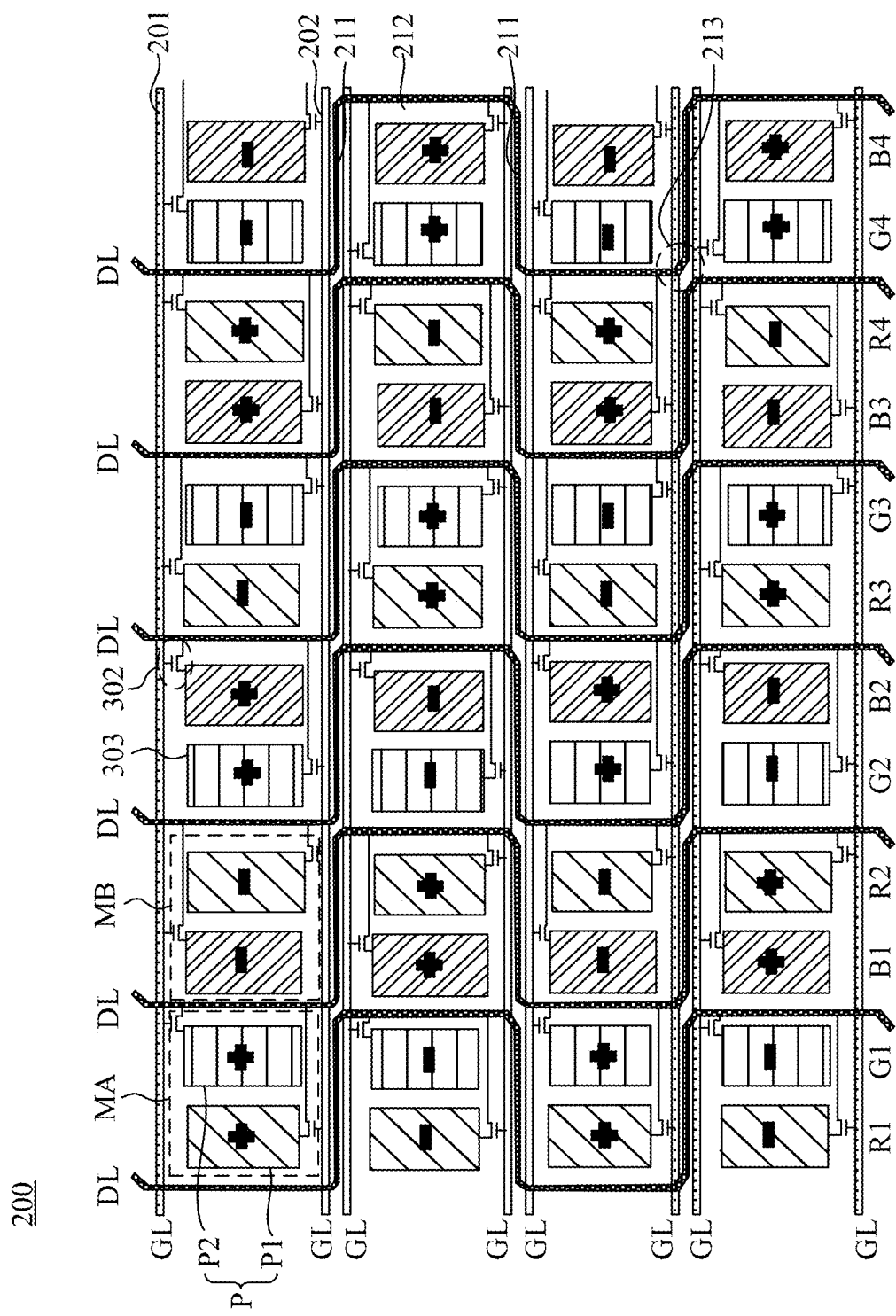
FIG. 4B is a diagram showing yet another pixel architecture, in accordance with some embodiments of the present disclosure.
Figure 4C:
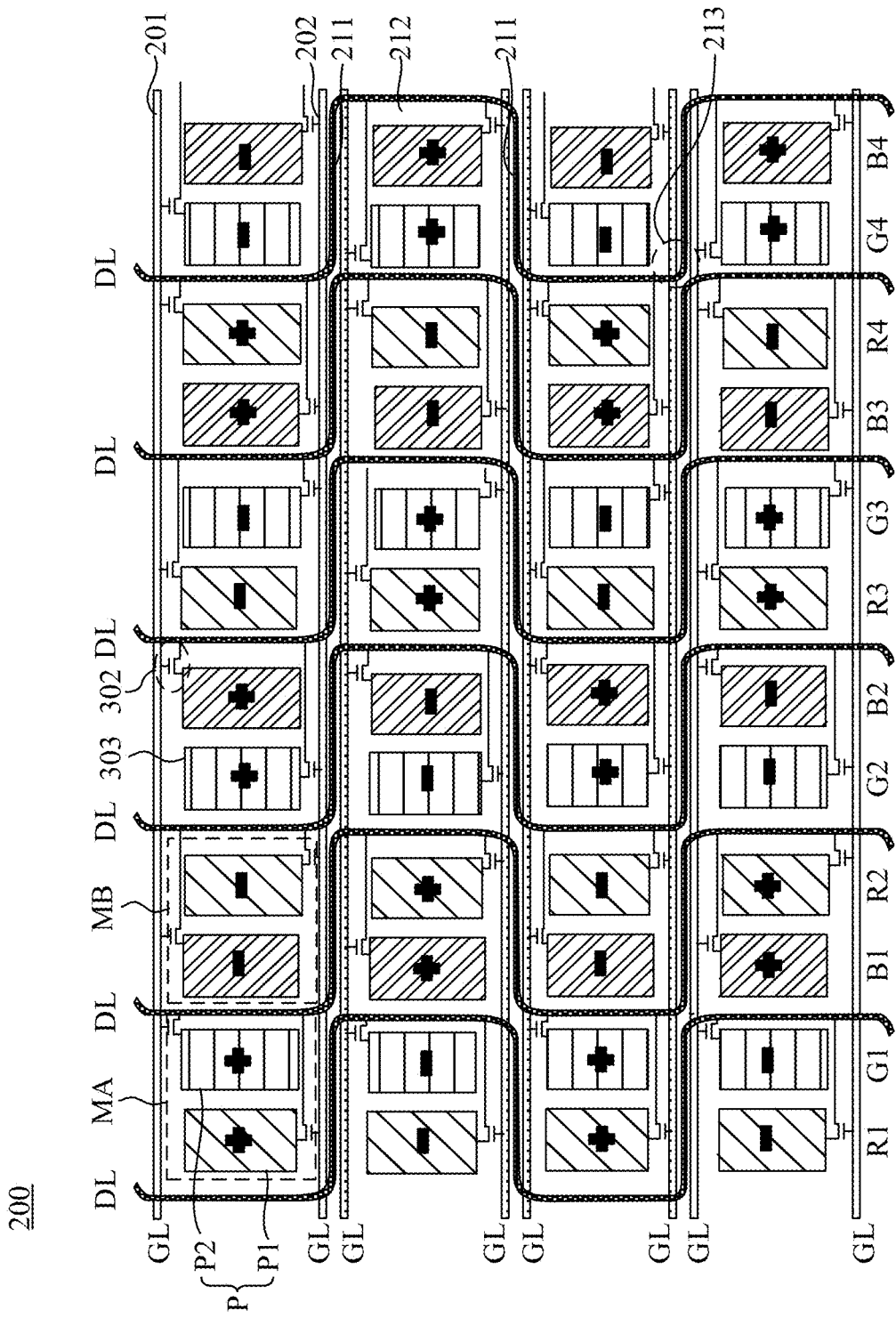
FIG. 4C is a diagram showing yet another pixel architecture, in accordance with some embodiments of the present disclosure.

In some embodiments, as shown in FIGS. 4B and 4C, the data line DL further includes a plurality of transition portions 213, and each transition portion 213 connects a first extension portion 211 and a second extension portion 212 that are adjacent to each other.

It may be avoided that a sharp end is formed on a corner of the data line DL by providing the transition portion 213 at a junction of the first extension portion 211 and the second extension portion 212 (i.e., corner of the data line DL), thereby preventing the data line DL from generating electrostatic discharge (ESD) due to its sharp end.

For example, as shown in FIG. 4B, the transition portion 213 of the data line DL is linear, and an included angle between the linear transition portion 213 and the first extension portion 211 connected to the linear transition portion 213, and an included angle between the transition portion 213 and the second extension portion 212 connected to the transition portion 213, are both obtuse angles.

The data line DL may be prevented from forming the sharp end at the corner through the above arrangement manner.

For example, as shown in FIG. 4C, the transition portion 213 is arc-shaped, and a center of a circle extended from the arc-shaped transition portion 213 is located inside a projection portion surrounded by the first extension portion 211 and the second extension portion 212 that are connected by the transition portion 213. That is, the arc-shaped transition portion 213 is located at a corner of the projection portion, and the arc-shaped transition portion 213 protrudes outward of the projection portion.

A surface of the data line DL at the corner is made smooth and gentle through the above arrangement manner, which may prevent the data line DL from forming the sharp end at the corner.

Figure 7:
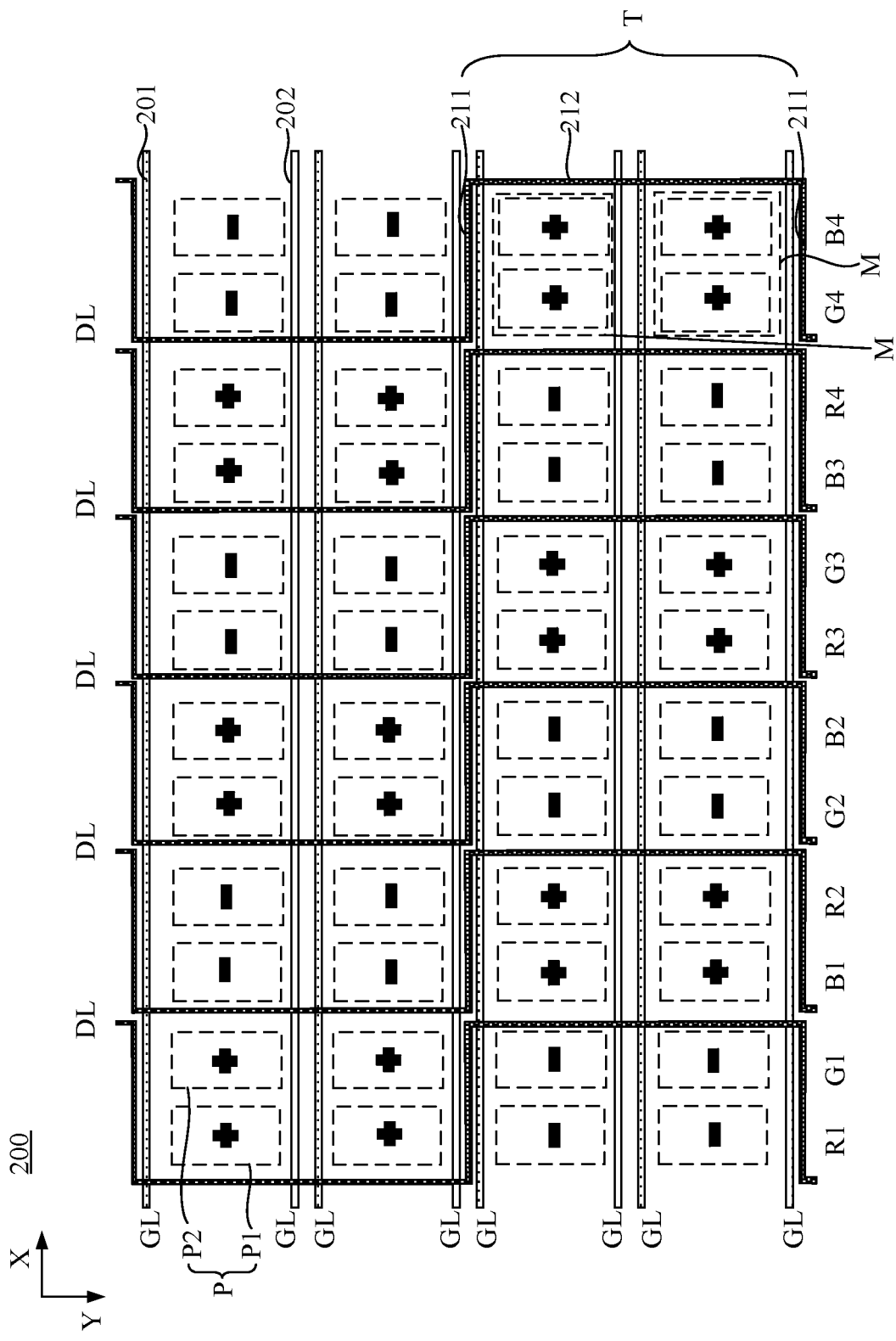
FIG. 7 is a diagram showing yet another pixel architecture, in accordance with some embodiments of the present disclosure.
Figure 8A:
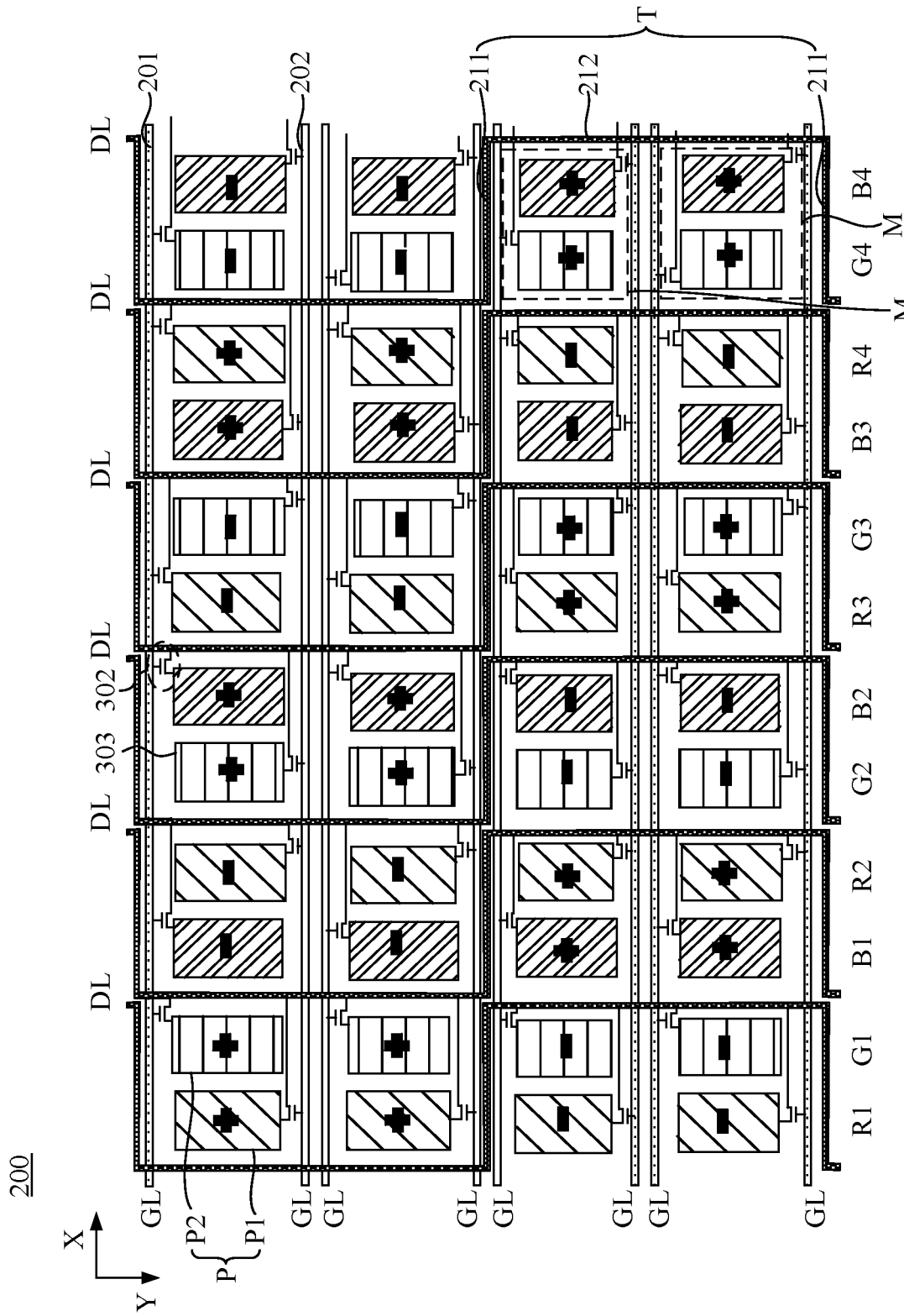
FIG. 8A is a diagram showing yet another pixel architecture, in accordance with some embodiments of the present disclosure.

In some embodiments, as shown in FIGS. 7 and 8A, a projection portion T accommodates two pixel regions M, and the two pixel regions M are arranged in the second direction Y.

For example, the ratio of the length of the second extension portion 212 of the data line DL to a dimension of a sub-pixel P in the second direction Y is greater than 2 and less than 2.5, so as to ensure that the projection portion T may accommodate two rows of sub-pixels P in the pixel regions M. For example, the ratio of the length of the second extension portion 212 of the data line DL to the dimension of the sub-pixel P in the second direction Y is 2.1, 2.2, 2.3, or 2.4.

In some embodiments, in a case where a projection portion T accommodates two pixel regions M, all sub-pixels P in each projection portion T are coupled to a same data line DL to receive data voltage signals with the same voltage polarity. Sub-pixels P in two adjacent projection portions T in the second direction Y are coupled to two adjacent data lines DL, respectively, so as to receive data voltage signals with the opposite voltage polarities.

For example, as shown in FIG. 8A, all sub-pixels P in each projection portion T receive data voltage signals with the same voltage polarity. Sub-pixels in two adjacent projection portions T in the second direction Y receive data voltage signals with the opposite voltage polarities. Therefore, sub-pixels P in two adjacent projection portions T in the first direction X receive data voltage signals with the opposite voltage polarities.

Figure 9A:
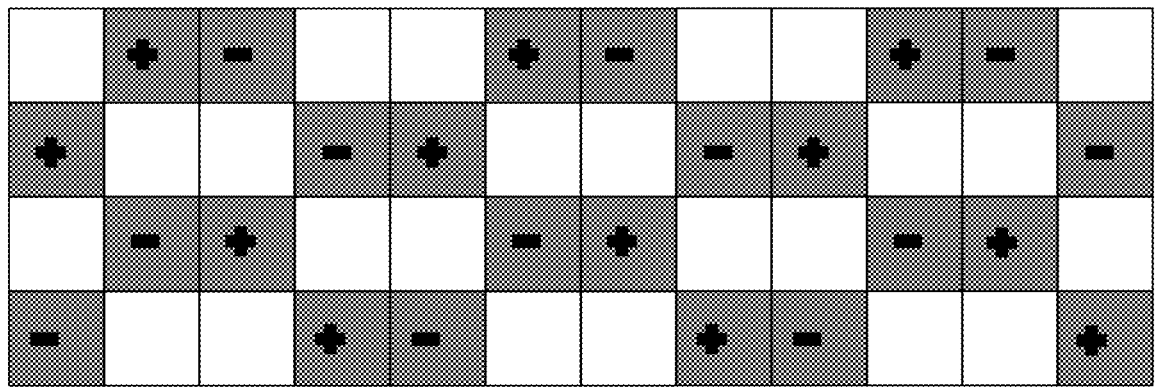
FIG. 9A is a schematic diagram showing sub-pixels in yet another charging condition, in accordance with some embodiments of the present disclosure.

When the pixel architecture 200 in the above embodiments is working, the sub-pixels P in the odd-numbered rows (e.g., the first row) may be charged according to an order in which the first gate lines 201 are turned on first, then the second gate lines 202 are turned on; and the sub-pixels P in the even-numbered rows (e.g., the second row) may be charged according to an order in which the second gate lines 202 are turned on first, then the first gate lines 201 are turned on. First, the first gate lines 201 in the odd-numbered rows and the second gate lines 202 in the even-numbered rows are turned on, so that in the columns marked as G1, B1, B2, R3, R4 and G4, sub-pixels P in the odd-numbered rows can be charged, and in the columns marked as R1, R2, G2, G3, B3 and B4, sub-pixels P in the even-numbered rows can be charged. FIG. 9A shows a charging condition of sub-pixels P when the first gate lines 201 in the odd-numbered rows and the second gate lines 202 in the even-numbered rows are turned on, the brightness of each sub-pixel P after being charged is medium.

Figure 9B:
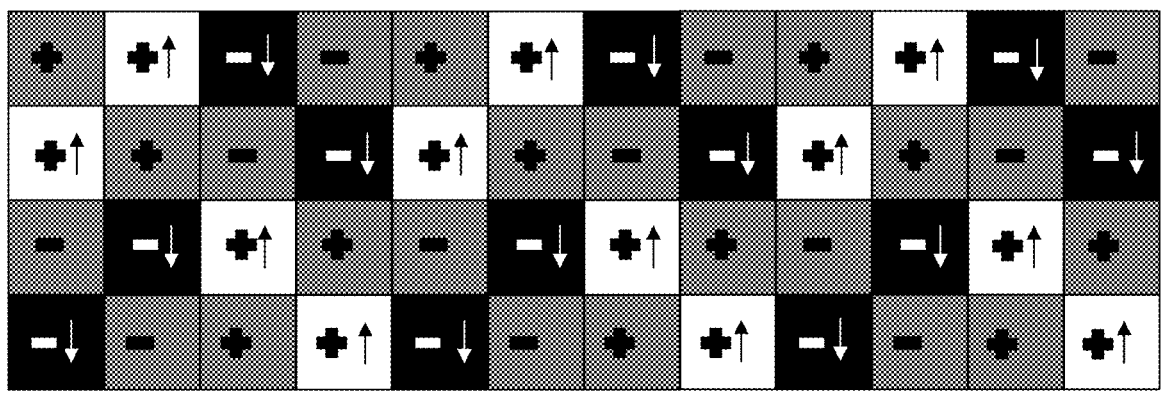
FIG. 9B is a diagram showing yet another bright and dark distribution of sub-pixels, in accordance with some embodiments of the present disclosure.

Then, the first gate lines 201 in the odd-numbered rows and the second gate lines 202 in the even-numbered rows are turned off, and the second gate lines 202 in the odd-numbered rows and the first gate lines 201 in the even-numbered rows are turned on. FIG. 9B shows a charging condition of sub-pixels P when the second gate lines 202 in the odd-numbered rows and the first gate lines 201 in the even-numbered rows are turned on. A bright and dark distribution of sub-pixels P in a same frame of image shown in FIG. 9B may be obtained according to the above lighting order, a brightness distribution of sub-pixels P in a same column is a cycle of "medium, bright, medium, dark" (e.g., the columns of sub-pixels P marked as R1, G2 and B3), a cycle of "bright, medium, dark, medium" (e.g., the columns of sub-pixels P marked as G1, B2 and R4), a cycle of "dark, medium, bright, medium" (e.g., the columns of sub-pixels P marked as B1, R3 and G4), or a cycle of "medium, dark, medium, bright" (e.g., the columns of sub-pixels P marked as R2, G3 and B4).

It can be seen from the above that, the brightness of the two adjacent sub-pixels P in two adjacent columns of sub-pixels P is the same, for example, in the two columns of sub-pixels P marked as G1 and B1, the brightness of two adjacent sub-pixels P located in the even-numbered rows is medium. Or, the brightness of the two adjacent sub-pixels P in two adjacent columns of sub-pixels P may be neutralized, for example, in the two columns of sub-pixels P marked as G1 and B1, the brightness of two adjacent sub-pixels P located in the odd-numbered rows is bright and dark, respectively, and the brightness of the two adjacent sub-pixels P may be neutralized. Therefore, through the pixel structure 200 as described above, it is possible to avoid a phenomenon of light and dark stripes due to a fact that overall brightness of the sub-pixels in two adjacent columns is slightly dark or slightly bright, so that the overall brightness of the same frame of image is medium, thereby ameliorating the phenomenon of shake line.

Figure 8B:
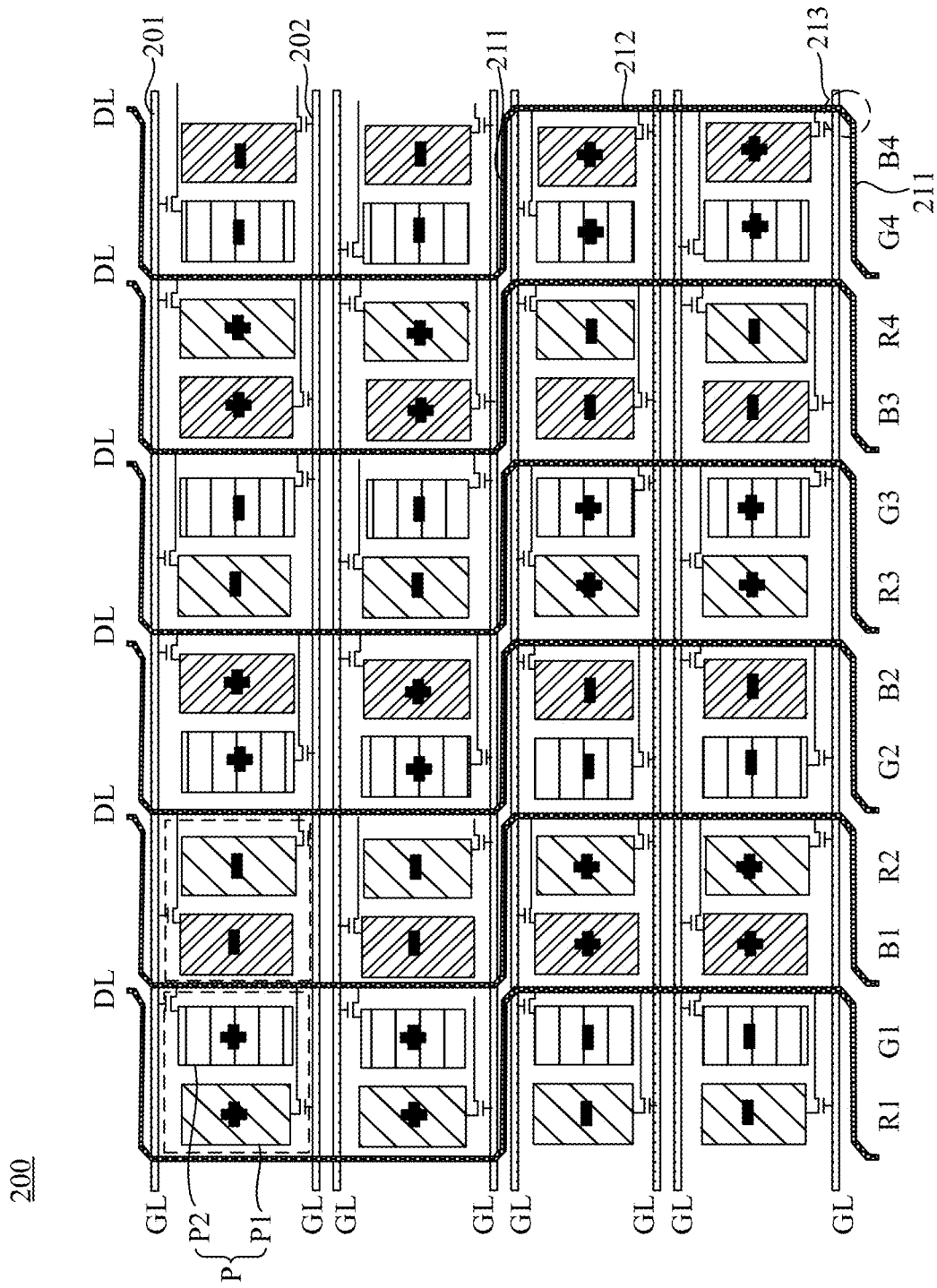
FIG. 8B is a diagram showing yet another pixel architecture, in accordance with some embodiments of the present disclosure.
Figure 8C:
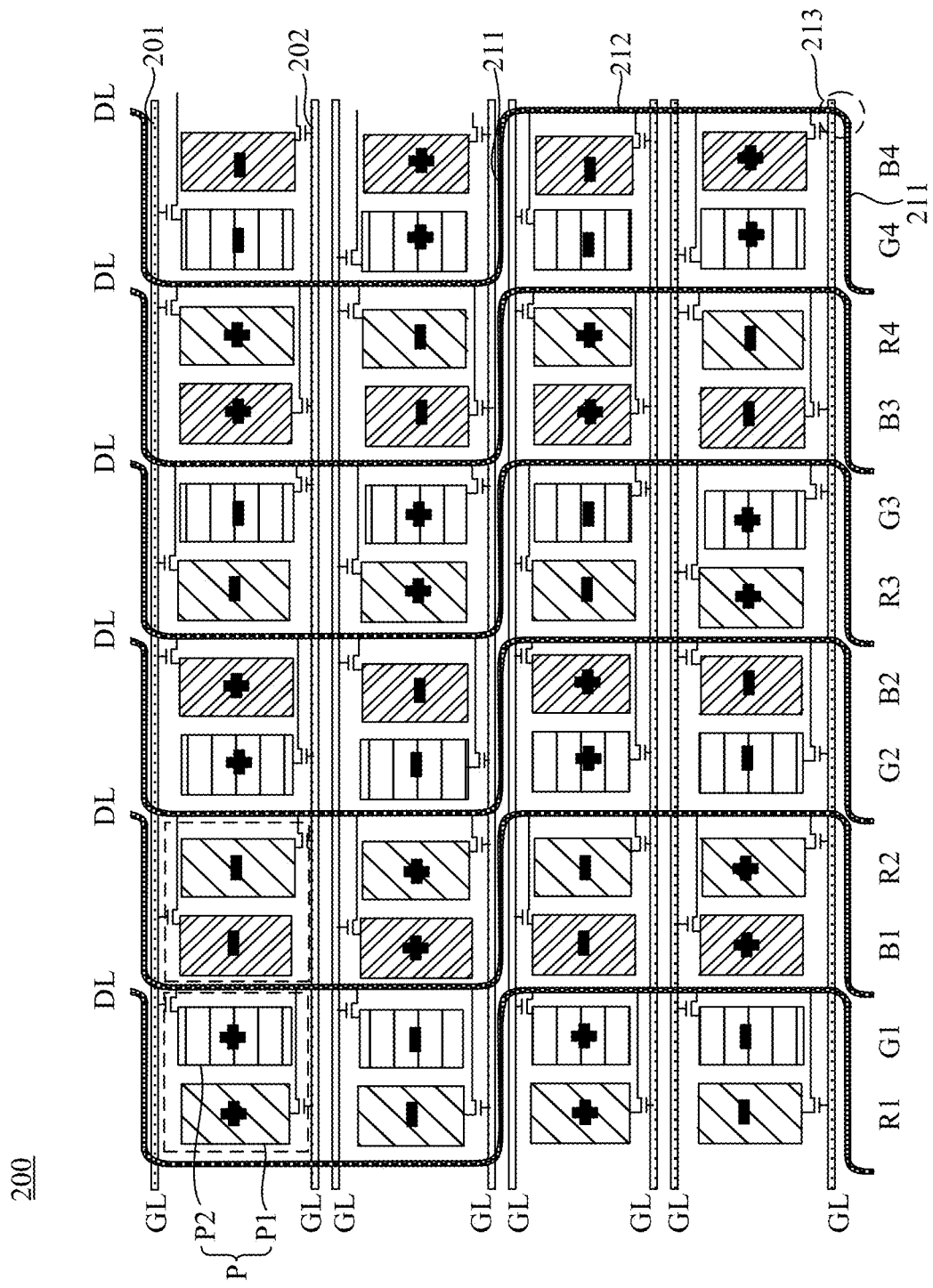
FIG. 8C is a diagram showing yet another pixel architecture, in accordance with some embodiments of the present disclosure.

In some embodiments, as shown in FIGS. 8B and 8C, the data line DL further includes a plurality of transition portions 213, and each transition portion 213 connects a first extension portion 211 and a second extension portion 212 that are adjacent to each other. Herein, the transition portion 213 and a linear transition portion 213 and an arc-shaped transition portion 213 below have the same beneficial effects as the transition portion 213 as described above, and will not be repeated herein.

For example, as shown in FIG. 8B, the transition portion 213 of the data line DL is linear, an included angle between the linear transition portion 213 and the first extension portion 211 connected to the linear transition portion 213, and an included angle between the transition portion 213 and the second extension portion 212 connected to the transition portion 213, are both obtuse angles.

For example, as shown in FIG. 8C, the transition portion 213 is arc-shaped, and a center of a circle extended from the arc-shaped transition portion 213 is located inside the projection portion surrounded by the first extension portion 211 and the second extension portion 212 that are connected by the transition portion 213.

Figure 10:
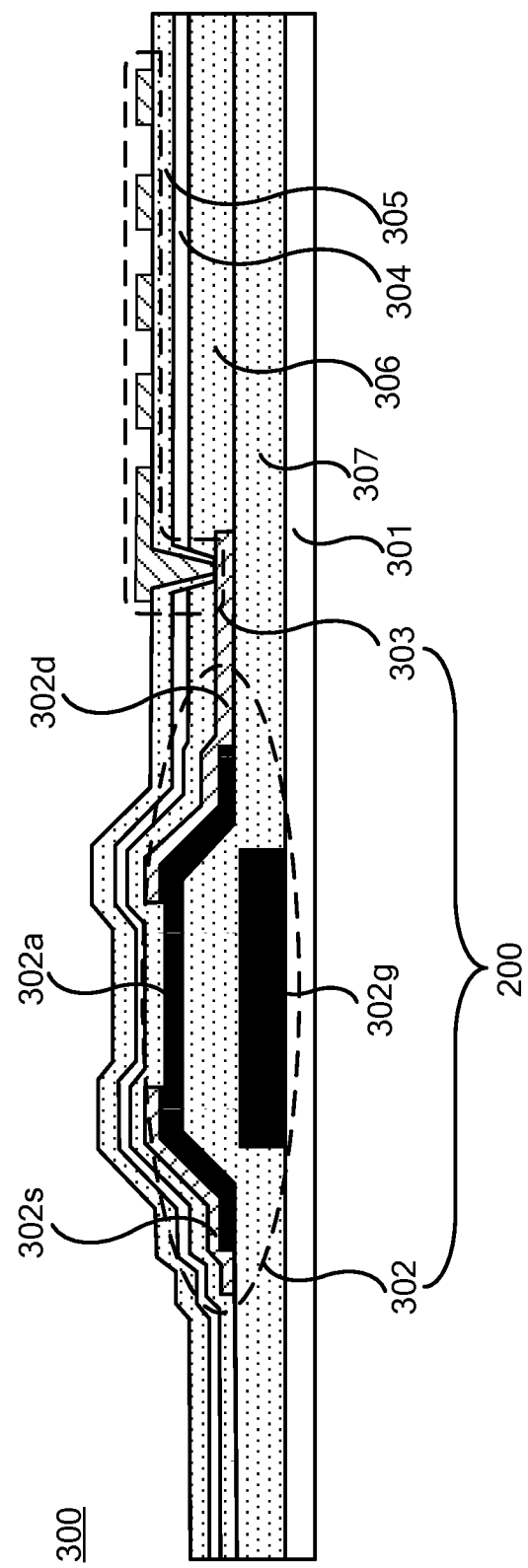
FIG. 10 is a sectional diagram showing an array substrate, in accordance with some embodiments of the present disclosure.

Some embodiments of the present disclosure provide an array substrate, as shown in FIG. 10, the array substrate 300 includes a base 301, and the pixel architecture 200 disposed on the base 301. Each sub-pixel in the pixel architecture 200 is provided with a thin film transistor 302 and a pixel electrode 303 located on the base 301. The thin film transistor 302 includes an active layer 302a, a source 302s, a drain 302d, a gate 302g and a portion of a gate insulating layer 307, and the source and the drain are in contact with the active layer. The data lines DL in the pixel architecture 200 may be disposed in a same layer as the source and the drain of the film transistor 302, and a data line DL may be coupled to one of the source and the drain of the thin film transistor 302. The pixel electrode 303 is coupled to the other one of the source and drain of the thin film transistor 302. FIG. 10 shows a situation where the pixel electrode 303 is coupled to the drain 302d of the thin film transistor 302. In this case, the data line DL is coupled to the source 302s of the thin film transistor 302.

The gate line transmits a gate scanning signal to the gate when the sub-pixel is charged in the above structure to control the thin film transistor 302 to be turned on, so that the data voltage signal transmitted to the source of the thin film transistor 302 is transmitted to the drain of the thin film transistor 302, and the data voltage signal is finally transmitted to the pixel electrode 303 to charge the sub-pixel.

In some embodiments, as shown in FIG. 10, the array substrate 300 further includes a common electrode 304 disposed above the base 301. The pixel electrode 303 and the common electrode 304 may be disposed in a same layer. In this case, the pixel electrode 303 and the common electrode 304 are each of a comb-tooth structure including a plurality of strip-shaped sub-electrodes. The pixel electrode 303 and the common electrode 304 may also be disposed in different layers. In this case, as shown in FIG. 10, a first insulating layer 305 is provided between the pixel electrode 303 and the common electrode 304. In a case where the common electrode 304 is disposed between the thin film transistor 302 and the pixel electrode 303, as shown in FIG. 10, a second insulating layer 306 is provided between the common electrode 304 and the thin film transistor 302.

Some embodiments of the present disclosure further provide a display apparatus, and the display apparatus may be a liquid crystal display (LCD) apparatus.

Figure 11:
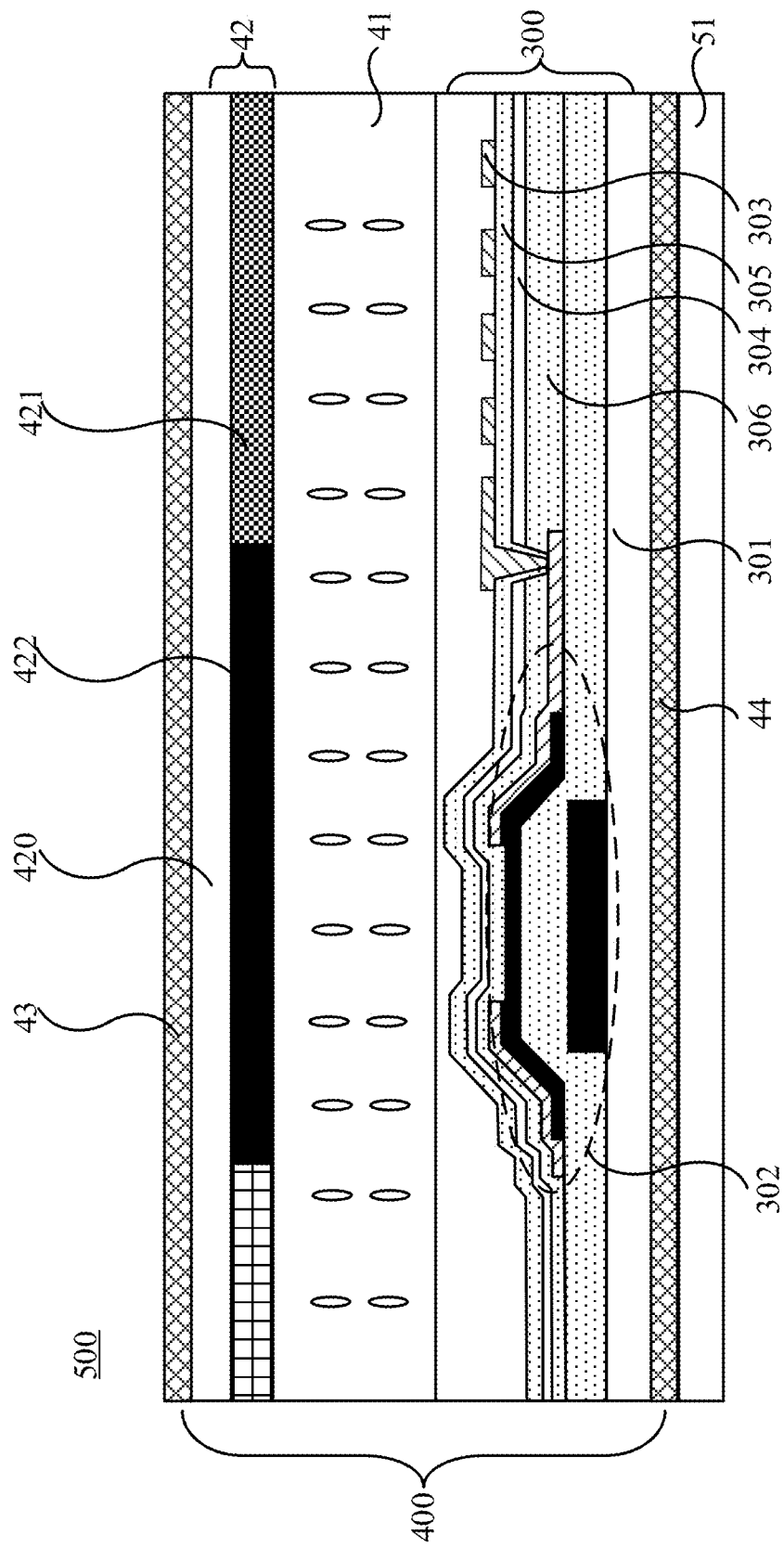
FIG. 11 is a sectional diagram showing a display apparatus, in accordance with some embodiments of the present disclosure.

In some embodiments, as shown in FIG. 11, the display apparatus 500 is the liquid crystal display apparatus, and the display apparatus 500 includes a liquid crystal display panel 400 and a backlight module 51. The backlight module 51 serves to provide the liquid crystal display panel 400 with light required for displaying images. A main structure of the liquid crystal display panel 400 includes the array substrate 300, an opposite substrate 42 and a liquid crystal layer 41 disposed between the array substrate 300 and the opposite substrate 42.

In the array substrate 300 of the liquid crystal display apparatus provided by the embodiments of the present disclosure, through the pixel structure 200 as described above, the brightness of two adjacent columns of sub-pixels may be the same, or the brightness between two adjacent columns of sub-pixels may be neutralized, which may avoid the phenomenon of light and dark stripes due to the fact that the overall brightness of the sub-pixels in two adjacent columns is slightly dark or slightly bright, thereby ameliorating the phenomenon of shake line and enhancing a display effect of the liquid crystal display apparatus.

As shown in FIG. 11, the opposite substrate 42 includes a color filter layer 421 disposed on the array substrate 420, in this case, the opposite substrate 42 may also be referred to as a color filter (CF) substrate. The color filter layer 421 at least includes red photoresist units, green photoresist units and blue photoresist units, and the red photoresist units, the green photoresist units and the blue photoresist units directly face the sub-pixels on the array substrate 300 in a one-to-one correspondence. The opposite substrate 42 further includes a black matrix pattern 422 disposed on the base substrate 420. The black matrix pattern 422 serves to separate the red photoresist units, the green photoresist units and the blue photoresist units, so as to prevent cross-color between the sub-pixels of different colors.

In some other embodiments, the opposite substrate 42 further includes a common electrode 304. That is, the common electrode 304 may be disposed in the opposite substrate 42.

As shown in FIG. 11, the liquid crystal display panel 400 further includes a first polarizer 43 disposed on a surface of the opposite substrate 42 away from the liquid crystal layer 41, and a second polarizer 44 disposed on a surface of the array substrate 300 away from the liquid crystal layer 41.

The display apparatus 500 may be a high transmission rate advanced super dimension switch (HADS) liquid crystal display apparatus, and may also be an advanced super dimension switch (ADS) liquid crystal display apparatus, an in-plane switching (IPS) liquid crystal display apparatus, a fringe field switching (FFS) liquid crystal display apparatus, a twisted nematic (TN) LCD apparatus, a multi-domain vertical alignment (MVA) liquid crystal display apparatus, or a patterned vertical alignment (PVA) liquid crystal display apparatus.

The display apparatus 500 may be any device that displays images whether in motion (e.g., a video) or stationary (e.g., a static image), and whether literal or graphical. More specifically, it is anticipated that the described embodiments may be implemented in or associated with a variety of electronic devices. The variety of electronic devices may be (but not limited to), for example, a mobile telephone, a wireless device, a personal data assistant (PAD), a hand-held or portable computer, a global positioning system (GPS) receiver/navigator, a camera, an MPEG-4 Part 14 (MP4) video player, a video camera, a game console, a watch, a clock, a calculator, a television monitor, a flat-panel display, a computer monitor, a car display (e.g., an odometer display), a navigator, a cockpit controller and/or display, a camera view display (e.g., a rear view camera display in a vehicle), an electronic photo, an electronic billboard or sign, a projector, a building structure, and a packaging and an aesthetic structure (e.g., a display for an image of a piece of jewelry).

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel architecture comprising:
a plurality of sub-pixels arranged in an array;
a plurality of gate lines extending in a first direction, the first direction being a row direction in which the plurality of sub-pixels are arranged; and two gate lines of the plurality of gate lines being provided between every two adjacent rows of sub-pixels;
a plurality of data lines, each data line including a plurality of first extension portions and a plurality of second extension portions that are alternately connected, each first extension portion extending in the first direction, each second extension portion extending in a second direction, and the first direction intersecting the second direction; wherein
the plurality of gate lines and the plurality of data lines define a plurality of pixel regions, two sub-pixels arranged in the first direction are provided in each pixel region, and two sub-pixels in a same pixel region are coupled to two gate lines adjacent to the pixel region, respectively;
two gate lines that are adjacent to a row of pixel regions and are located on two sides of the row of pixel regions are a first gate line and a second gate line, respectively;
for two sub-pixels in each pixel region of the row of pixel regions, one sub-pixel is coupled to the first gate line, and another sub-pixel is coupled to the second gate line;
the two sub-pixels of the pixel region arranged in the first direction are a first sub-pixel and a second sub-pixel, respectively;
the row of pixel regions includes a plurality of first pixel regions and a plurality of second pixel regions; and two adjacent pixel regions in the row of pixel regions are a first pixel region and a second pixel region, respectively;
a first sub-pixel in each first pixel region is coupled to the second gate line, and a second sub-pixel in each first pixel region is coupled to the first gate line;
a first sub-pixel in each second pixel region is coupled to the first gate line, and a second sub-pixel in each second pixel region is coupled to the second gate line;
in the data line, every two adjacent first extension portions and a second extension portion connected between the two adjacent first extension portions constitute a projection portion accommodating at least one pixel region;
every two adjacent data lines are configured to transmit data voltage signals with opposite voltage polarities; all sub-pixels in each projection portion are coupled to a same data line to receive data voltage signals with same voltage polarity; sub-pixels in two adjacent projection portions in the second direction are respectively coupled to two adjacent data lines to receive data voltage signals with opposite voltage polarities; and
a ratio of a length of the first extension portion of the data line to a dimension of a sub-pixel in the first direction is greater than 2, and is less than or equal to 3.

2. The pixel architecture according to claim 1, wherein a projection portion accommodates one pixel region.

3. The pixel architecture according to claim 2, wherein a ratio of a length of the second extension of the data line to a dimension of a sub-pixel in the second direction is greater than 1 and less than 1.5.

4. The pixel architecture according to claim 1, wherein a projection portion accommodates two pixel regions, and the two pixel regions are arranged in the second direction.

5. The pixel architecture according to claim 4, wherein a ratio of a length of the second extension of the data line to a dimension of a sub-pixel in the second direction is greater than 2 and less than 2.5.

6. The pixel architecture according to claim 1, wherein a second extension of a data line is provided between every two adjacent pixel regions in the first direction; and
all sub-pixels in the pixel region are coupled to a data line located on a same side of the pixel region.

7. The pixel architecture according to claim 6, wherein in the second direction, second extensions of a same data line are alternately disposed on two sides of a same column of pixel regions.

8. The pixel architecture according to claim 1, wherein the first extensions of the data line are located between two gate lines that are between two adjacent rows of sub-pixels.

9. The pixel architecture according to claim 1, wherein the data line further includes a plurality of transition portions, and each transition portion connects a first extension portion and a second extension portion that are adjacent to each other.

10. The pixel architecture according to claim 9, wherein the transition portion of the data line is linear, and an included angle between the linear transition portion and the first extension portion connected to the linear transition portion, and an included angle between the transition portion and the second extension portion connected to the transition portion, are both obtuse angles.

11. An array substrate comprising:
a base; and
the pixel architecture according to claim 1, disposed on the base.

12. A display apparatus comprising the array substrate according to claim 11.

13. The pixel architecture according to claim 1, wherein the first direction is perpendicular to the second direction.

14. The pixel architecture according to claim 9, wherein the transition portion is arc-shaped, and a center of a circle extended from the arc-shaped transition portion is located inside a projection portion surrounded by the first extension portion and the second extension portion that are connected by the transition portion.

* * * * *